(12) United States Patent
Krauss

(10) Patent No.: US 8,024,706 B1
(45) Date of Patent: Sep. 20, 2011

(54) TECHNIQUES FOR EMBEDDING TESTING OR DEBUGGING FEATURES WITHIN A SERVICE

(75) Inventor: David Krauss, Raleigh, NC (US)

(73) Assignee: Teradata US, Inc., Dayton, OH (US)

( * ) Notice: Subject to any disclaimer, the term of this patent is extended or adjusted under 35 U.S.C. 154(b) by 1194 days.

(21) Appl. No.: 11/236,129

(22) Filed: Sep. 27, 2005

(51) Int. Cl.
*G06F 9/44* (2006.01)
(52) U.S. Cl. ............. 717/124; 717/131; 714/20; 714/45
(58) Field of Classification Search .......... 717/124–135, 717/168–178; 719/321–327; 710/8–21; 714/20, 45
See application file for complete search history.

(56) References Cited

U.S. PATENT DOCUMENTS

| | | | |
|---|---|---|---|
| 5,319,645 A | | 6/1994 | Bassi et al. |
| 5,691,926 A | | 11/1997 | Cannon et al. |
| 5,754,755 A | | 5/1998 | Smith, Jr. |
| 5,838,975 A | | 11/1998 | Abramson et al. |
| 5,920,312 A | | 7/1999 | Wagner et al. |
| 5,970,245 A | | 10/1999 | Poteat et al. |
| 6,002,395 A | | 12/1999 | Wagner et al. |
| 6,067,639 A | * | 5/2000 | Rodrigues et al. ............... 714/38 |
| 6,219,803 B1 | | 4/2001 | Casella et al. |
| 6,243,862 B1 | * | 6/2001 | Lebow ............................ 717/131 |
| 6,587,969 B1 | * | 7/2003 | Weinberg et al. ............... 714/46 |
| 6,772,083 B2 | | 8/2004 | Muller et al. |
| 6,810,494 B2 | * | 10/2004 | Weinberg et al. ............... 714/46 |
| 6,820,192 B2 | | 11/2004 | Cho et al. |
| 6,895,578 B1 | | 5/2005 | Kolawa et al. |
| 7,363,616 B2 | * | 4/2008 | Kalyanaraman ............... 717/124 |
| 2004/0128651 A1 | * | 7/2004 | Lau ................................ 717/124 |
| 2006/0156287 A1 | * | 7/2006 | Vikram .......................... 717/124 |

OTHER PUBLICATIONS

Johnson et al., Using XML as a flexible, portable test script language; IEEE, Sep. 2003 pp. 187-192.*
Kaminski et al., The generation of communications interface test scripts using a knowledge-based tool; IEEE, 1988, vol. 1, pp. 542-546.*

* cited by examiner

*Primary Examiner* — Wei Zhen
*Assistant Examiner* — Satish Rampuria
(74) *Attorney, Agent, or Firm* — Schwegman, Lundberg & Woessner

(57) ABSTRACT

Techniques are presented for embedding testing and debugging features within a service. A user service is modified to include record and playback features. When a record feature is activated, actions and state transitions, which occur within the user service, are monitored and recorded. These actions and transitions are represented within a script. During playback, the actions and state transitions are automatically replayed within the user service by accessing operations of the user service that are represented or mapped within the script.

17 Claims, 3 Drawing Sheets

TECHNIQUES FOR EMBEDDING TESTING OR DEBUGGING FEATURES WITHIN A SERVICE

FIELD

The invention relates generally to data processing and more particularly to techniques for embedding testing and debugging features within a service.

BACKGROUND

Traditionally, testing and debugging features are associated with an operating system (OS) or administrative tools associated with a system. That is, testing and debugging features usually include low-level operations, which are reserved and geared toward skilled engineers who are adept in such processing.

However, it is not usually the skilled engineers that encounter problems with software services; it is usually a more-conventional end-user of the software services that encounters problems. Consequently, there is a certain amount of interfacing and manual communication that is often required between an end-user and an engineer when problems arise with a software service. In some cases, the exact state of a problem cannot be recreated or even remembered by an end-user, such that problem resolution becomes extremely difficult for the engineer who is trying to resolve the problem. Furthermore, a time lag is experienced before an end-user can experience resolution to his/her problems; this time lag can be expensive in time critical situations.

In another situation, a software service may include a number of sub services, such that when a particular sub service is upgraded an entire suite of test operations are performed on the upgraded sub service for purposes of validating the upgrade before it is placed in production for the software service. Often, these test operations are manually performed within the software service and are not recorded for subsequent reuse. Thus, when a sub service is upgraded a second time, the entire process is repeated from scratch. This is a waste of valuable resources and time within an enterprise and is fraught with the potential for manually introduced errors.

In still other related scenarios, an end user may want to interact with a software service for purposes of performing a number of repetitive tasks. Each task may entail several hundred independent actions within the software service. The software service may not be designed to support batch processing, such that scripts could automate these repetitive tasks. Consequently, the end user manually records each independent action for a first task, and then manually interacts with the software service to process all the independent actions for each different task by using what was previously transcribed as a guide. This is also time consuming and is also prone to manually introduced errors when the end user inadvertently performs a wrong action within the software service.

Accordingly, it can be seen that conventional software services lack sufficient testing and debugging features.

SUMMARY

In various embodiments, techniques for embedding testing and debugging features within a service are provided. In an embodiment, a testing and debugging system is taught. The testing and debugging system includes a user service, an automated testing and debugging engine, and a script. The automated testing and debugging engine is integrated within the user service and records the script while the automated testing and debugging engine is in record mode. The automated testing and debugging engine interactively and dynamically processes the script while in playback mode.

DETAILED DESCRIPTION

Figure 1:
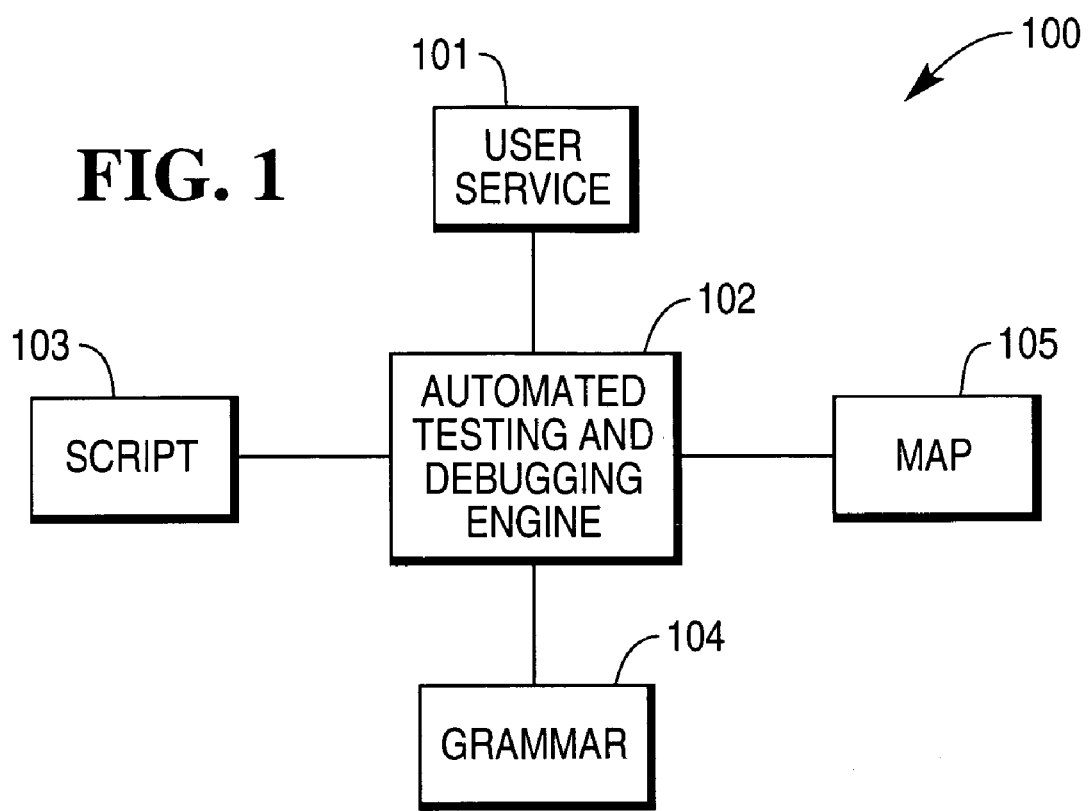
FIG. 1 is a diagram of a testing and debugging system, according to an example embodiment.

FIG. 1 is a diagram of a testing and debugging system 100, according to an example embodiment. The testing and debugging system 100 is implemented in a machine-accessible or computer-readable medium and is optionally accessible over a network. The network may be wired, wireless, or a combination of wired and wireless.

FIG. 1 is presented for purposes of illustration only and is not intended to limit embodiments of the testing and debugging system 100, since it is readily apparent that some components of the FIG. 1 may be subsumed into other components, that additional components may be added, and/or that some components may be deleted; all without departed from the beneficial teachings presented herein and below.

The testing and debugging system 100 includes a user service 101, an automated testing and debugging engine 102, and a script 103. In some embodiments, the testing and debugging system 100 may also include a grammar 104 and/or a map or mapping 105. Each of these will now be discussed in turn.

The user service 101 is any service that is modified to include an option or command for communicating with the automated testing and debugging engine 102. That is, the user service 101 may be any existing software application, software service, or software system that has been modified to interface or call the automated testing and debugging engine 102.

In an embodiment, the user service 101 is a customer relationship management (CRM) system, such as the Teradata® CRM products distributed by NCR Corporation of Dayton, Ohio. The CRM system includes a plurality of Graphical User Interface (GUI) screens, where at least one screen provides a pull down option that permits features associated with the automated testing and debugging engine 102 to be activated. However, it is to be understood that any user service 101 that includes a modification to activate one or more features of the automated testing and debugging engine 102 can be the user service 101 of the testing and debugging system 100.

The automated testing and debugging engine 102 is designed to be activated at least partially from the user service 101. The automated testing and debugging engine 102 includes at least two modes of operation that is visible and activated from the user service 101. The two modes are 1) a record or capture mode and 2) a playback mode. It should also be noted that in some embodiments, other modes of operation may exist, such as an editing mode, a monitoring mode, a reporting mode, and the like.

In a record mode, the automated testing and debugging engine 102 monitors or traps actions, operations, state transitions, values for variables, and screen interfaces that are being activated and processed within the user interface 101. This information is trapped as high-level and low level commands that are executed from within the user service 101. For example, in a record mode the automated testing and debugging engine 102 captures when a user activates a pull down screen to load a file into the user service 101. The command to pull down the file menu option and select a "file open" command and the name of the file entered or selected from the subsequent GUI are all captured by the automated testing and debugging engine 102.

The information captured during record mode is used by the automated testing and debugging engine 102 to subsequently build a script 103. The script 103 is in a language format that is recognized by the automated testing and debugging engine 102. The script 103 when processed by the automated testing and debugging engine 102 during the play back mode will recreate the processing that was captured during the record mode.

The record mode ends when the user instructs the automated testing and debugging engine 102 to stop or exit the record mode; the user provides this instruction via the user service 101. In some cases a profile that defines an event or a length of time may also be used to determine when a record mode is terminated. In still further cases, the record mode may be enabled for an entire session that an end user has with the user service 101 and automatically terminated when the session ends normally or abnormally.

In an embodiment, the user service 101 tracing or tracking of the activities and state transitions, which occur during the record mode, are represented by the automated testing and debugging engine 102 as operations that are visible within the script 103 as higher-level user service 101 operations or constructs. That is, the end-user recognizes and appreciates the information included within the script 103 as information associated with operations of the user service 101. The lower-level operations or constructs are also recorded but hidden from the visible script 103 details. In this manner, an end-user will understand and appreciate the syntax and information included within the script 103, and the automated testing and debugging engine 102 maps the higher-level constructs to a plurality of lower-level actions that have to occur to reproduce what transpired during the record mode.

As an example script 103 having higher-level constructs or syntax that is readily recognized by an end user, consider a record mode that traps or traces a login within a user service 101. The script 103 may appear as follows:

BEGIN SCRIPT 001
        LOGIN SCREEN
        USER ID "DAVID KRAUSS"
        PASSWORD "*********"
        Sign in Complete
        END LOGIN SCREEN
    END SCRIPT 001

The above example illustrates how the actual information visible within the script 103 can be provided in easily understood syntax and semantic format, which an end user would readily comprehend. However, the automated testing and debugging engine 102 masks or hides the actual detail or the commands that are processed within the user service 101 to make the various screens and actions take place. There are no indications in the example of screen objects used by the user service 101 like pushbuttons or edit fields and no commands that signify events, such as mouse move or tabbing to specific fields. The language is presented at a high level within the script and specifically maps to the objects and actions of the user service 101, which the end user is familiar with.

According to an embodiment, the script 103 is adapted to be manually edited via an editor. The automated testing and debugging engine 102 may use a grammar 104 that defines a custom processing language, which is presented and visible within the script 103. Some commands recognized by the grammar 104 may include special operations that are recognized and processed by the automated testing and debugging engine 102 during playback mode, such as a checkpoint operation. A checkpoint operation may instruct the automated testing and debugging engine 102 to pause or halt processing of the script 103 at a particular location within the script 103; a location where the checkpoint operation is inserted manually into the script 103 by an end user. This permits stepwise processing of the script 103 during playback mode. Other commands may permit end users to display or write certain values of variables to files or to a screen monitor for viewing during playback mode. In fact, the commands recognized by the grammar 104 may be configured according to desired features of the automated testing and debugging engine 102.

In an embodiment, the grammar 104 defining the syntax and semantics of the script 103 may also be associated with a map or mapping 105. The automated testing and debugging engine 102 uses the map 105 to expand higher-level grammar commands defined within the script 103 to a plurality of lower-level operations associated with the user service 101. Thus, the map 105 is a mechanism for the automated testing and debugging engine 102 to maintain a proper linkage between a higher-level script 103 command and the specific user service 101 commands. The map 105 may include the syntax of operations and commands recognized and processed by the user service 101. Thus, the user service 101 does not need modification beyond calls to the automated testing and debugging engine 102, since the automated testing and debugging engine 102 generates and processes the script 103 during a playback mode of operation and since the script 103 uses commands and operations recognized by the user service 101 to achieve playback.

In a playback mode of operation, the automated testing and debugging engine 102 parses and processes the script 103 that was generated during a previous record mode of operation within the user service 101. The automated testing and debugging engine 102 does this by issuing commands recognized by the user service 101 to the user service 101.

In an embodiment, the automated testing and debugging engine 102 may maintain other metadata associated with results produced by the user service 101 while commands are issued from the script 103 during a playback mode. For example, processing load, memory usage, end user identifier, time of day, etc. may be trapped in a tracking or audit log by the automated testing and debugging engine 102. Some of this information may be used by the end user or may be supplied to a skilled engineer for purposes of better facilitating a resolution to an end user problem with the user service 101.

Playback mode may occur in an automated fashion, such as when the script 103 is processed without any end user interaction or interference. Alternatively, playback mode may occur in a semi-automated or partially manual manner, such as when checkpoints or stepwise operation of the script 103 is used. In this latter scenario, an end user may manually reinitiate processing after pauses occur within the script 103 for checkpoint commands.

The testing and debugging system 100 may be used by an end user for a variety of purposes. In one situation, the end user initiates a record mode of the automated testing and debugging engine 102 when problems are encountered and the end user desires to trace or trap the problem within the user service 101. In another situation, the end user may use the record mode to trap repetitive actions within a script 103. The end user may then edit the script 103 to change some values for variables, such as customer identifier and have the automated testing and debugging engine 102 reprocess the script with a different customer identifier. This facilitates reuse and provides automation within a user service 101 that may not otherwise be capable of such automation. In yet another case, the end user may use a record mode to trap testing procedures for a certain aspect or feature of the user service 101, such that the resulting script 103 may be saved, recalled, and reprocessed as desired when updates or upgrades to the certain aspect are made to the user service 101.

Thus, it can be seen how the testing and debugging system 100 may be used to provide novel automation that includes testing and debugging features which are embedded within a user service 101. These embedded features are achieved by calling or linking the automated testing and debugging engine 102. Accordingly, the user service 101 does not require extensive modifications to achieve the novel embedded testing and debugging features. This is so, because the automated testing and debugging engine 102 handles the details on behalf of the user service 101 and handles the details in a transparent manner.

Figure 2:
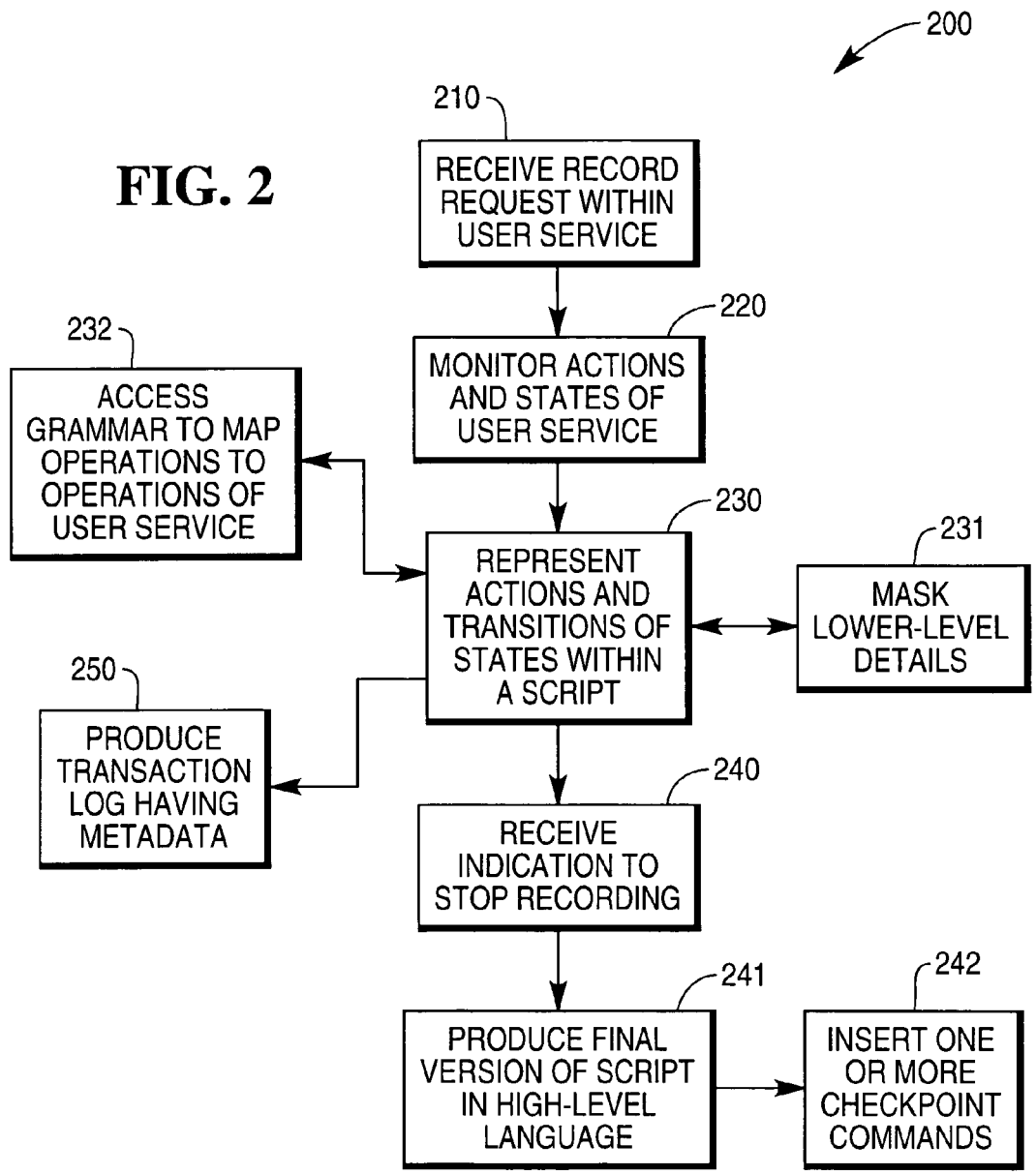
FIG. 2 is a diagram of a method for record mode processing of the testing and debugging system presented in FIG. 1, according to an example embodiment.

FIG. 2 is a diagram of a method 200 for record mode processing of the testing and debugging system 100 presented in FIG. 1, according to an example embodiment. The method 200 (hereinafter "recording service") is implemented in a machine-accessible and readable medium and is optionally accessible over a network. The recording service represents the processing of the automated testing and debugging engine 102 during a record mode of operation.

At 210, the recording service receives a record request from within a user service. Examples of a user service 101 were provided above with respect to the testing and debugging system 100 of FIG. 1. Receipt of the record request may occur in a variety of manners. For example, an end user may manually activate a feature within the user service to inform the recording service of the record request. Alternatively, a profile associated with an end user may instruct the user service to call the recording service with the record request for a particular end user. In still other cases, events or policies may trigger the user service into an action that initiates the recording service with the record request. Each of these scenarios is intended to represent processing where the recording service receives a record request from within a user service.

At 220, the recording service begins to monitor, capture, or track actions and/or states within the user service after the record request is received. That is, the recording service, in response to a received record request, begins to actively record and capture actions and state transitions occurring within the user service.

In an embodiment, the information captured by the recording service from the user service may be stored in an intermediate and normalized language format, such as, but not limited to extensible markup language (XML).

At 230, the recording service represents or translates the captured information that includes the actions and/or state transitions within a script. In some embodiments, the recording service masks the lower-level details of the actions and/or state transitions from the visible portions of the script. That is, the script includes higher-level constructs or language that an end user would recognize and appreciate it. The actual mapping between the higher-level constructs or language and the lower-level details may be maintained by the recording service via a map. Examples of scripts and these mapping techniques were provided above with the descriptions of the testing and debugging system 100 of FIG. 1.

According to an embodiment, at 232, the recording service may access a grammar to map operations of the script to operations of the user service. Thus, a script operation translates into one or more user service recognized operations and the grammar may be used to define the syntax and semantics of the script and to map or link the script information to specific user service operations.

In an embodiment, at 240, the recording service receives an indication to stop recording actions and/or states within the user service. This may occur via a manual instruction or upon the happening of an event, such as when an end user logs out of or exits from the user service. Alternatively, the indication may be received pursuant to evaluation of a policy or profile associated with the end user. At 241, once the recording service stops recording the actions and state transitions, the recording service produces a final version of the script. As was detailed above, the final version may include high-level syntax and semantics associated with a high-level end user defined language.

The final version of the script may be edited manually or edited automatically by other services. According to an embodiment, at 242, the final version may be edited to include one or more inserted checkpoint commands. A checkpoint command instructs the script to halt or pause processing until a resume operation or command is received when the script is processed during a subsequent playback mode. Examples of playback processing for an automated testing and debugging engine 102 are provided below with the description of the method 300 and FIG. 3.

In still another embodiment, at 250, the recording service may produce a transaction log for the recording session. The log may include metadata about the recording session of the user service, such as identifiers for end users, time of day, resource configurations, resource loads, and the like. This metadata may be subsequently consumed for reporting purposes or for purposes of facilitating problem resolution associated with the user service.

Figure 3:
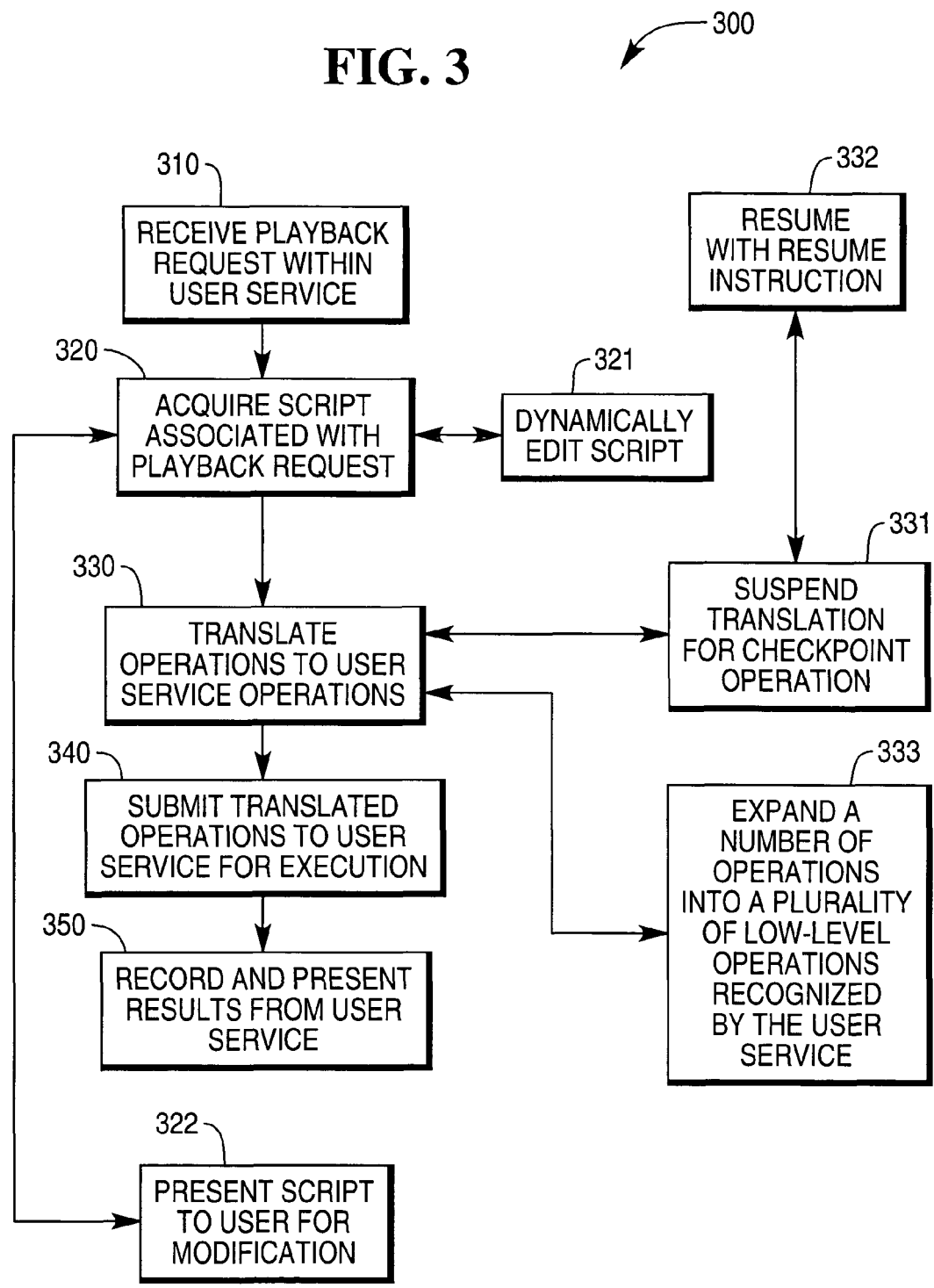
FIG. 3 is a diagram of a method for playback mode processing of the testing and debugging system presented in FIG. 1, according to an example embodiment.

FIG. 3 is a diagram of a method 300 for playback mode processing of the testing and debugging system presented in FIG. 1, according to an example embodiment. The method 300 (hereinafter "playback service") is implemented in a machine-accessible and readable medium and is optionally accessible over a network. The playback service represents the processing of the automated testing and debugging engine 102 associated with the testing and debugging system 100 of FIG. 1. The record mode of operation for the automated testing and debugging engine 102 was presented above with the method 200 of FIG. 2.

At 310, the playback service receives a playback request from within a user service. The receipt of the playback request may occur in a variety of manners. For example, an end user may load and execute a desired script that starts the playback service. Alternatively, the playback service may be activated upon the occurrence of an event, such as a configured data and time. Still further, the playback service may receive the playback request that initiates the playback service processing when a particular script is activated via a double mouse click from a GUI. In fact, a variety of scenarios can provide the playback request to the playback service. Each such scenario is intended to be included within the embodiments of this invention.

At 320, the playback service acquires the script that is associated with the playback script. Acquisition may occur in a variety of manners. For example, an identifier that uniquely identifies the desired script may be associated with or included with the playback request. Alternatively, a subsequent GUI screen may be initiated by the playback service upon receiving the playback request to instruct an end-user to select or manually identify the desired script.

In an embodiment, at 321, the end user, an automated application, or an automated service may be dynamically permitted, via the playback service, to edit the script. This may include an editing service or editor that is associated with the playback service. Alternatively, the editor may be entirely separate from the playback service. The script may be edited to include other operations that the playback service recognizes or to modify certain aspects of the script desired by an end user. For example, at 322, the playback service may present the script to an end user for manual modification after the script has already been processed by the playback service once. In this manner, the end user may repetitively perform tasks or operations within a user service in an automated fashion, such as when desired operations are to be processed within the user service for a plurality or list of different customers.

At 330, the playback service translates operations defined in the script into user service operations that are recognized and processed independently by the user service. That is, the script commands are translated into user service commands for subsequent processing.

In an embodiment, a number of the script commands may be associated with operations that are not necessarily recognized by the user service but are recognized by the playback service. For example, at 331, a checkpoint operation or command within the script may instruct the playback service to suspend or temporarily halt processing of the script. At 332, the script commands may resume processing when a manually submitted resume operation is received by the playback service or when events defined within the script dictate that the resume instruction should be processed.

According to an embodiment, at 333, the playback service may expand a single script command or operation into a plurality of low-level operations recognized by the user service. Examples of this were provided above, and such situations occur when the script is provided in a high-level language that maps to a plurality of specific low-level operations within the user service.

At 340, the playback service submits the translated operations to the user service for execution. The user service then executes the commands as if they were issued directly from an end user. So, the user service is not aware of the processing and actions of the playback service. This provides an example of how easily the playback service can be integrated or embedded into user services.

In an embodiment, at 350, the playback service may present and/or record the results from the user service processing to an end user. In some cases, this entails displaying the user service and its actions to the end user during the playback. In other cases, this may entail recording information in a log or a report that the end user or other personnel may view.

It has now been demonstrated how a user service may be enhanced via simple calls and integration to an automated testing and debugging engine 102. The testing and debugging engine 102 effectively enhances the user service with seamlessly embedded testing and debugging features. In some cases, the testing and debugging engine 102 also facilitates automated processing and repetitive processing within the user service 102, even in situations where the user service may not have originally supported such features.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

The Abstract is provided to comply with 37 C.F.R. §1.72(b) and will allow the reader to quickly ascertain the nature and gist of the technical disclosure. It is submitted with the understanding that it will not be used to interpret or limit the scope or meaning of the claims.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A computer-implemented system, comprising:
    a computer configured to process a user service, the user service is an existing software application modified to include a command that permits the user service to call an automated testing and debugging engine, the automated testing and debugging engine includes a record mode of operation, a playback mode of operation, an editing mode of operation, a monitoring mode of operation, and a reporting mode of operation, the automated testing and debugging engine handles details of each mode being used in a transparent manner from the user service;
    the computer also configured to process the automated testing and debugging engine; and
    the computer configured to process a script, the automated testing and debugging engine is integrated within the user service, via the command, and is to record the script while the automated testing and debugging engine is in the record mode, the record mode traps actions, operations, state transitions, values for variables, and screen interfaces that are being activated and processed by the user service, the user service includes a user interface that a user interacts with, and the automated testing and debugging engine is to process the script while in the playback mode, the automated testing and debugging engine is to also maintain during the playback mode data for processing load, memory usage, end user identifier and time of day, the data trapped in an audit log, the user service is only modified to make the call to the automated and testing debugging engine.

2. The system of claim 1, wherein the automated testing and debugging engine is to create the script while in the record mode using a grammar that defines operations of the user service.

3. The system of claim 1, wherein the automated testing and debugging engine is to perform manual stepwise operation of the script while in the playback mode.

4. The system of claim 1, wherein the automated testing and debugging engine is to perform automated operation of the script while in the playback mode.

5. The system of claim 1, wherein portions of the script produced during the record mode are adapted to be manually edited.

6. A computer-implemented method to execute on a computer, comprising:

receiving a record request from within a user service, the user service is an existing software application modified to include a command that permits the user service to communicate the record request via a call to the method, the user service is only modified to make the call to the method, the method is an external recording service activated via the record request, the record request communicated in response to a profile associated with an end-user of the user service, actions of the external recording service are transparent to the user service;

monitoring actions and states within the user service after receipt of the record request, the monitoring captures actions and states occurring in the user service via actions of the end-user while interacting with the user service; and representing the actions and transitions for the states within a script that processes on the computer and when the scripted is processed metadata is captured for processing load, memory usage, end user identifier, and time of day, the metadata trapped to an audit log.

7. The method of claim 6 further comprising:
receiving an indication to stop recording; and
producing a final version of the script in a high-level data language, which can be subsequently viewed and manually modified.

8. The method of claim 7 further comprising, inserting one or more checkpoint commands into the final version of the script at selective locations in response to a manual modification of the final version of the script, wherein each checkpoint command instructs a playback operation of the final version of the script to halt or pause until another instruction is received to proceed.

9. The method of claim 6 further comprising, masking lower-level details associated with a number of the actions and the transitions as higher-level constructs within the script, wherein each higher-level construct combines multiple lower level details into a single construct within the script.

10. The method of claim 6, wherein representing further includes accessing a grammar to map the actions and the transitions into operations that are recognized and processed by the user service, wherein the operations represent the script.

11. A computer-implemented method to execute on a computer, comprising:

receiving a playback request from within a user service, receipt of the playback request automatically activated in response to a detected occurrence of an event by the user service, and the user service is an existing software application modified to include an option that permits the user service to communicate the playback request upon detection of the event by calling the method with the playback request, the user service is only modified to call the method;

acquiring a script associated with the playback request;

translating operations defined in the script into operations recognized by the user service; and submitting the translated operations to the user service for processing, and when processed by the user service metadata is captured for processing load, memory usage, end user identifier, and time of day, the metadata trapped to an audit log, at least some of the translated operations were not originally, until translated, capable of being supported by the user service.

12. The method of claim 11, wherein translating further includes suspending the translation when a select checkpoint operation is detected within the script.

13. The method of claim 12 further comprising, resuming the translation when a resume instruction is received to proceed with the translation.

14. The method of claim 11, wherein translating further includes expanding a number of the operations included within the script into a plurality of lower-level operations recognized by the user service.

15. The method of claim 11 further comprising, recording and/or presenting results produced by the user service for the submitted and translated operations being processed by the user service.

16. The method of claim 11 further comprising, dynamically editing a number of variables within the script and automatically reprocessing the translation and submission processing.

17. The method of claim 11 further comprising, presenting the script to the user for modification before performing the translation and submission processing.

* * * * *